United States Patent
Pehl et al.

(10) Patent No.: US 6,512,232 B2
(45) Date of Patent: Jan. 28, 2003

(54) METHOD AND APPARATUS FOR IMPROVING THE SENSITIVITY OF A GAMMA CAMERA

(76) Inventors: Richard H. Pehl, 813 Barnhart St., Raymond, WA (US) 98577; Rex C. Trammell, 216 Hogohegee Dr., Andersonville, TN (US) 37705; Aaron B. Brill, 370 St. Andrews Dr., Franklin, TN (US) 37069

( * ) Notice: Subject to any disclaimer, the term of this patent is extended or adjusted under 35 U.S.C. 154(b) by 35 days.

(21) Appl. No.: 09/742,867

(22) Filed: Dec. 20, 2000

(65) Prior Publication Data

US 2002/0134942 A1 Sep. 26, 2002

(51) Int. Cl.$^7$ ............................................. G01T 1/166
(52) U.S. Cl. ................................... 250/369; 250/252.1
(58) Field of Search .............................. 250/369, 252.1, 250/363.02, 363.03, 363.05, 363.07, 363.09, 370.09, 370.11, 366

(56) References Cited

U.S. PATENT DOCUMENTS

| | | | | | |
|---|---|---|---|---|---|
| 3,876,882 A | * | 4/1975 | Todd | ........................... | 250/366 |
| 5,567,944 A | * | 10/1996 | Rohe et al. | ............ | 250/370.09 |
| 5,821,541 A | * | 10/1998 | Tumer | ................... | 250/370.09 |
| 6,057,551 A | * | 5/2000 | Tararine | ................ | 250/363.03 |
| 6,323,492 B1 | * | 11/2001 | Clinthorne | ................... | 250/394 |
| 6,346,706 B1 | * | 2/2002 | Rogers et al. | ........ | 250/363.04 |

OTHER PUBLICATIONS

Kauffman et al., Imaging with a Small Ultra Pure Germanium Gamma–Camera, IEEE Transactions on Nuclear Science, vol. NS–22, 395–403, Feb. 1975.

Bieszk, et al., "A Method of Improving Photon Detection Efficiency of High Purity Germanium Cameras by Including Double–Interaction Photopeak Events," IEEE Transactions on Nuclear Science, Feb. 1983, pp. 586–590, vol. NS–30, No. 1.

* cited by examiner

*Primary Examiner*—Constantine Hannaher
*Assistant Examiner*—Otilia Gabor
(74) *Attorney, Agent, or Firm*—Pitts & Brittian, P.C.

(57) ABSTRACT

A method and apparatus for improving the sensitivity of a position sensitive gamma ray detector and gamma camera. To obtain good position resolution, small effective detector elements are required. However, such small detector elements cause nearly all the gamma rays interacting by Compton scattering to be lost, i.e., they will not contribute to forming the image. The method and apparatus of the present invention takes advantage of the fact that when an incoming gamma ray of known energy is completely absorbed in two separate detector elements the sum of the energy depositions identifies this gamma ray as a valid event. Furthermore, for incoming gamma rays having energies less than 511/2 keV the position where the smallest energy is deposited is the first interaction site and therefore this position can also contribute to forming the image. Alternatively, both interaction sites can be used to form the image, thus improving sensitivity but increasing background noise compared with the preferred embodiment.

7 Claims, 6 Drawing Sheets

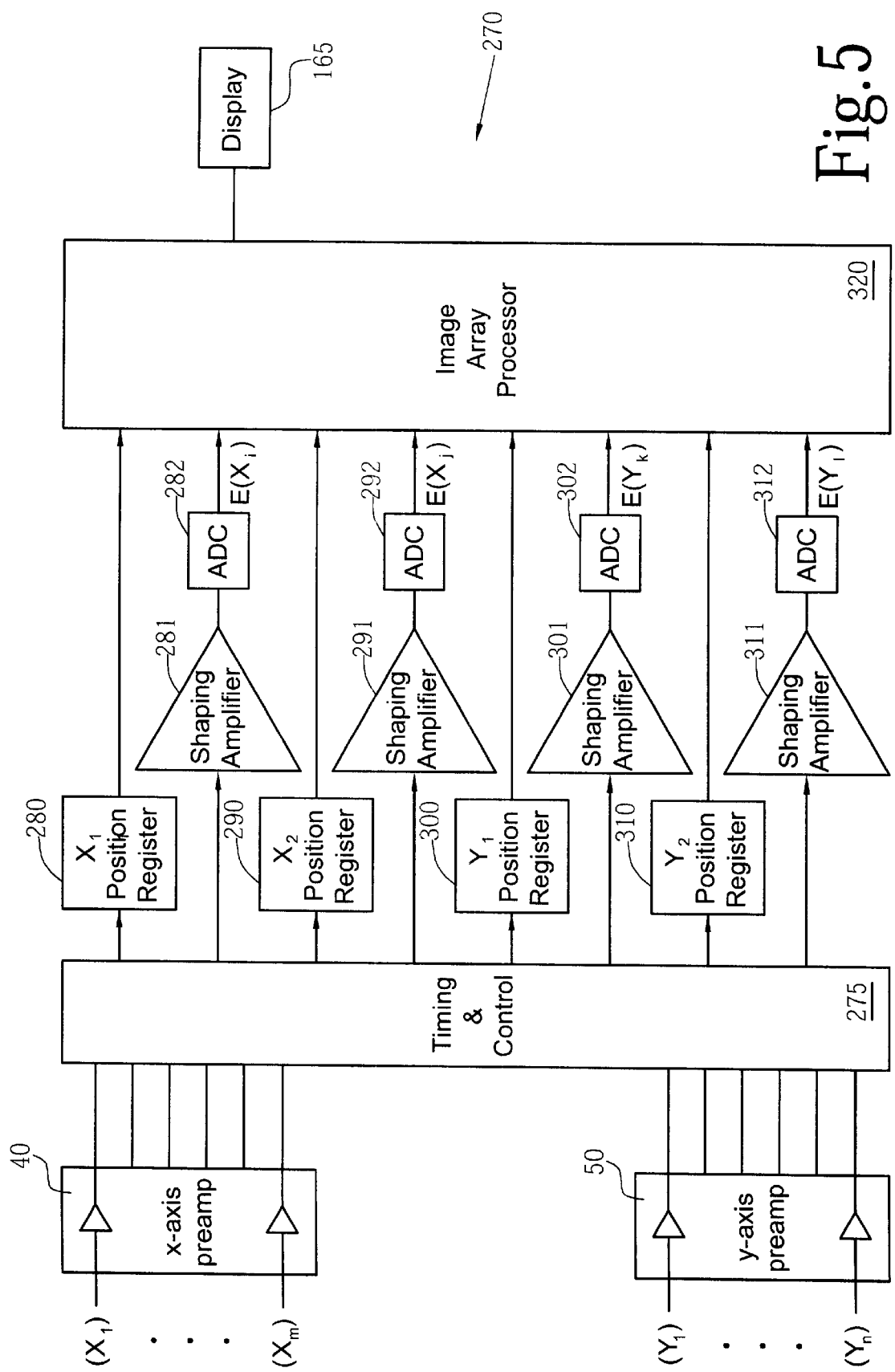

METHOD AND APPARATUS FOR IMPROVING THE SENSITIVITY OF A GAMMA CAMERA

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of Invention

The invention relates to an improvement in the sensitivity of a position sensitive gamma ray detector or gamma camera. More specifically, the invention describes a method of and an apparatus for producing useful position information from Compton scattered photons in a position sensitive gamma ray detector.

2. Description of the Related Art

Gamma-ray imaging is a useful tool in many areas of science, particularly in the biological and medical fields. For example, the radioisotope Technetium 99 m can be caused to be preferentially absorbed in tumors. The location of such a tumor in the body can be determined by forming an image of the 140 keV photons emitted by the decay of the isotope. Conventional lenses cannot focus such high-energy photons and typical x-ray detectors are relatively insensitive to them. Accordingly, the image is formed using a closely packed array of collimators. The image is read out using a position sensitive gamma-ray detector. When a photon is absorbed by the detector, its x- and y-position is determined and the corresponding x- and y-position in the image array is incremented by one. The image brightness is thus proportional to the number of photons absorbed by each pixel. The detector must discriminate between photons that have come directly from the source and those that have been randomly scattered. Because the scattered radiation is lower in energy than the unscattered radiation, the detector must have some degree of energy resolution. Such detectors are often scintillators such as NaI or semiconductors such as CdTe, CdZeTe, Hgl, or germanium.

The most commonly used gamma cameras are based on scintillators, but it has long been recognized that a semiconductor detector with better energy resolution might give better images. Because germanium gamma-ray detectors have good absorption efficiency and extremely good energy resolution, many attempts have been made to manufacture a position sensitive germanium detector for this application.

One of the earliest practical cameras was described by Kaufman, et al., IEEE Trans. Nucl. Sci, NS-22, 395, 1975. This camera used a planar germanium gamma-ray detector with collecting electrodes formed as an array of narrow strips. The strips on each side were orthogonal to those on the other side. Thus, the signal from the strips on one side gives the x-position and the signal from the strips on the other side gives the y-position. If the strips are of equal width, then the effective pixel is a square with sides equal to the strip width.

Good position resolution requires the pixels to be small, usually one to three millimeters on each side. If the arriving 140 keV photon is absorbed by a photoelectric event, then the signal will be a valid event for forming the image. However, even if the germanium detector is thick enough to interact with most of the arriving 140 keV photons, the small effective detector area means that photons interacting by Compton scattering, even through a small angle, will be lost to that particular pixel. The signal produced will be smaller than the original photon energy, indistinguishable from those scattered in the body, and will thus be lost to the measurement. Because approximately one-half of the interacting photons at 140 keV are Compton scattered, the sensitivity of the detector is reduced.

Accordingly, there is a need for a system that is capable of measuring gamma rays that undergo Compton scattering.

Therefore, it is an object of this invention to provide a signal processing means and apparatus that greatly reduces the loss of sensitivity caused by Compton scattering in a gamma camera.

BRIEF SUMMARY OF THE INVENTION

When photons are absorbed in matter by Compton scattering, the maximum amount of energy that can be deposited in a single scattering event is given by the following equation:

$$E_{max} = E_{in} - \frac{511}{\left(2 + \frac{511}{E_{in}}\right)}$$

where $E_{max}$ is the energy deposited in the detector in keV and $E_{in}$ is the incident photon energy in keV. Equation 1 shows that, for energies up to 511/2 keV, the maximum energy deposited is less than one-half of the incident photon energy. For the 140 keV photon considered here, the maximum energy deposited in the detector for a single scattering event is about 50 keV. When one of these incoming photons is completely absorbed in two separate pixels in the detector, the sum of the pixel energies identifies the incoming photon as a valid unscattered event. The detector pixel that produces the lowest value of energy is the first interaction site and therefore the position that should be used to form the image. At energies higher than 511/2 some fraction of the incident photons will Compton scatter depositing more than half the incident photon energy. For energies up to several hundred keV that fraction will be small, thus statistically the pixel producing the smaller energy is still the pixel that should be used to form the image. Thus, by suitable processing of the signals, a large fraction of the otherwise unusable Compton scattered events are used to form the image, greatly improving the sensitivity of the camera. The figures and descriptions that follow will describe the method and apparatus required to correctly process such signals and achieve the increase in sensitivity.

The maximum increase in sensitivity and signal-to-background ratio is achieved by processing valid two pixel interactions by the preferred method described above. A somewhat simpler system can be used that gains much of the sensitivity of the preferred method. In the simpler system both pixels are used to form the image. One of the pixels is the correct image point and thus improves the sensitivity. The other pixel is randomly distributed over nearby image points and thus adds background counts. Because the background is distributed over a number of pixels and contributes no structure to the image it is clear that the overall image quality is improved. It is the intent of the present invention to include both methods, however, the preferred method is shown in the drawings.

BRIEF DESCRIPTION OF THE SEVERAL VIEWS OF THE DRAWINGS

The above-mentioned features of the invention will become more clearly understood from the following detailed description of the invention read together with the drawings in which:

FIG. 5 is a block diagram of the preferred embodiment of the electronics used to form an image from the gamma rays absorbed by the detector of FIG. 1 according to this invention.

DETAILED DESCRIPTION OF THE INVENTION

Figure 1:
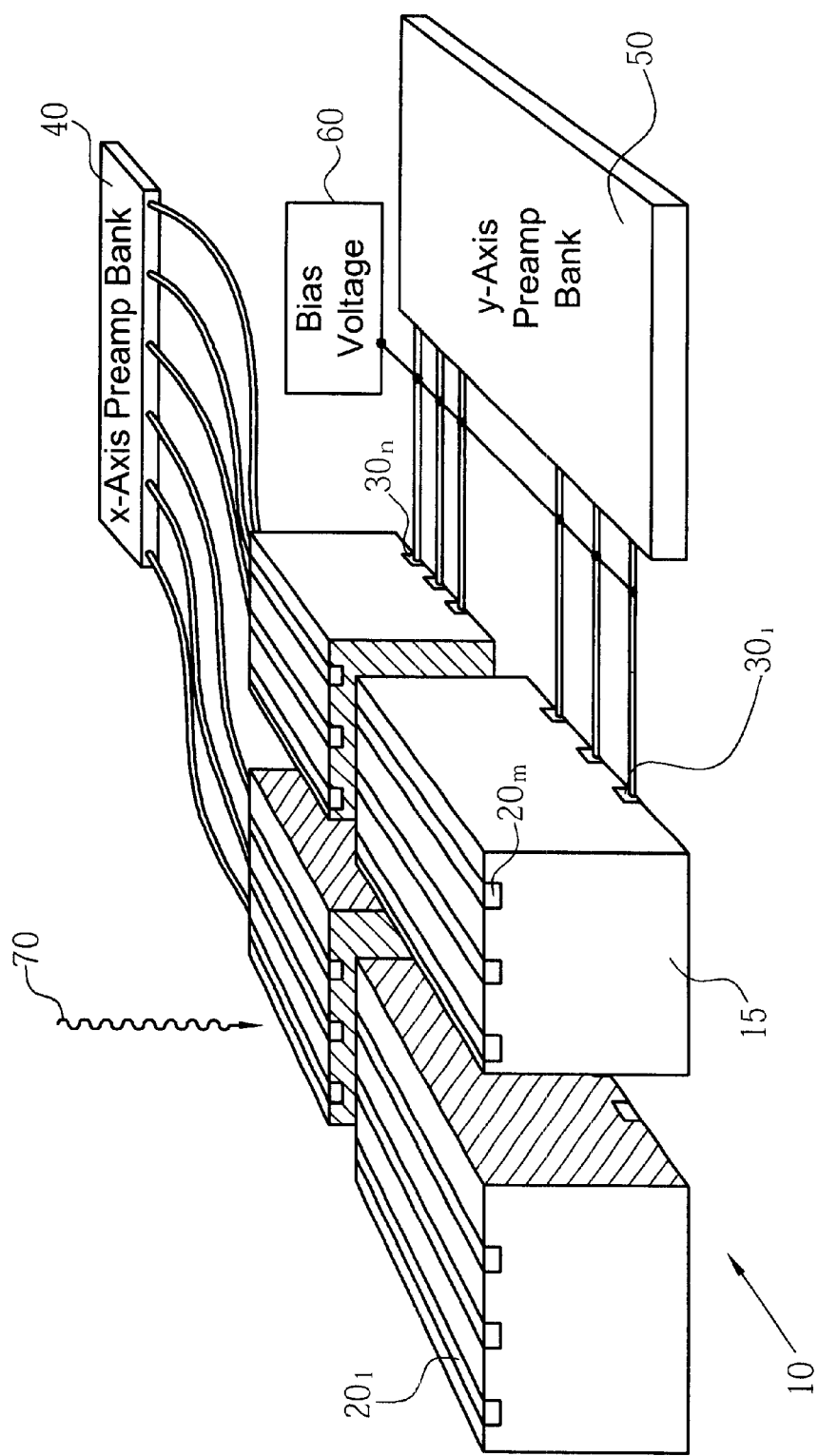
FIG. 1 depicts an orthogonal strip position sensitive radiation detector according to the prior art.

There is shown in FIG. 1 an orthogonal strip position sensitive radiation detector, or detector, 10 according to the prior art. A body of a semiconductor 15, for example high purity germanium, has a first plurality of rectifying strip contacts 20 defining an x-position and a second plurality of rectifying strip contacts 30 disposed at right angles to the first contacts 20 thereby defining a y-position. Assume that there are m strip contacts 20 and n strip contacts 30. Each strip contact has an associated preamplifier. The m x-axis preamplifiers, arranged in a bank, 40 are connected to the m x-axis position contacts 20. The n y-axis preamplifiers, arranged in a bank, 50 are connected to the n y-axis position contacts 30. Thus, there are m+n total preamplifiers and m×n possible combinations of x- and y-positions. The detector 10 is reverse biased by the bias voltage 60 such that a depletion region, free of mobile charge carriers, exists throughout the semiconductor 15. While the drawings and descriptions thereof reference a germanium orthogonal strip gamma ray detector used for medical imaging, it will be recognized by those skilled in the art that the methods described apply to many other types of detectors and other imaging applications. In particular, it is well known that if multiple images of the same source are taken at different angles, a computer-aided reconstruction can give a three-dimensional view of the source.

When a gamma ray photon 70 is absorbed by the detector 10, a quantity of mobile charge carriers is created in the detector 10. The number of charge carriers is proportional to the energy of the photon 70. Assuming the absorption process is a single point interaction, the charge carriers are localized at a point of (X, Y)=(i, j) in the semiconductor 15. The charge carriers move, under the influence of the electric field created by the bias voltage 60, to the nearest contact strips 20, 30. A signal is thus produced on the $i^{th}$ x-axis strip contact 20 and the $j^{th}$ y-axis strip contact 30. The $i^{th}$ x-axis preamplifier 40 and the $j^{th}$ y-axis preamplifier 50 integrate the signal current and produce a signal voltage step proportional to the energy of the photon 70. Because these signals occur at essentially the same time, coincidence logic circuits known to those skilled in the art can be used to qualify a valid event.

Figure 2:
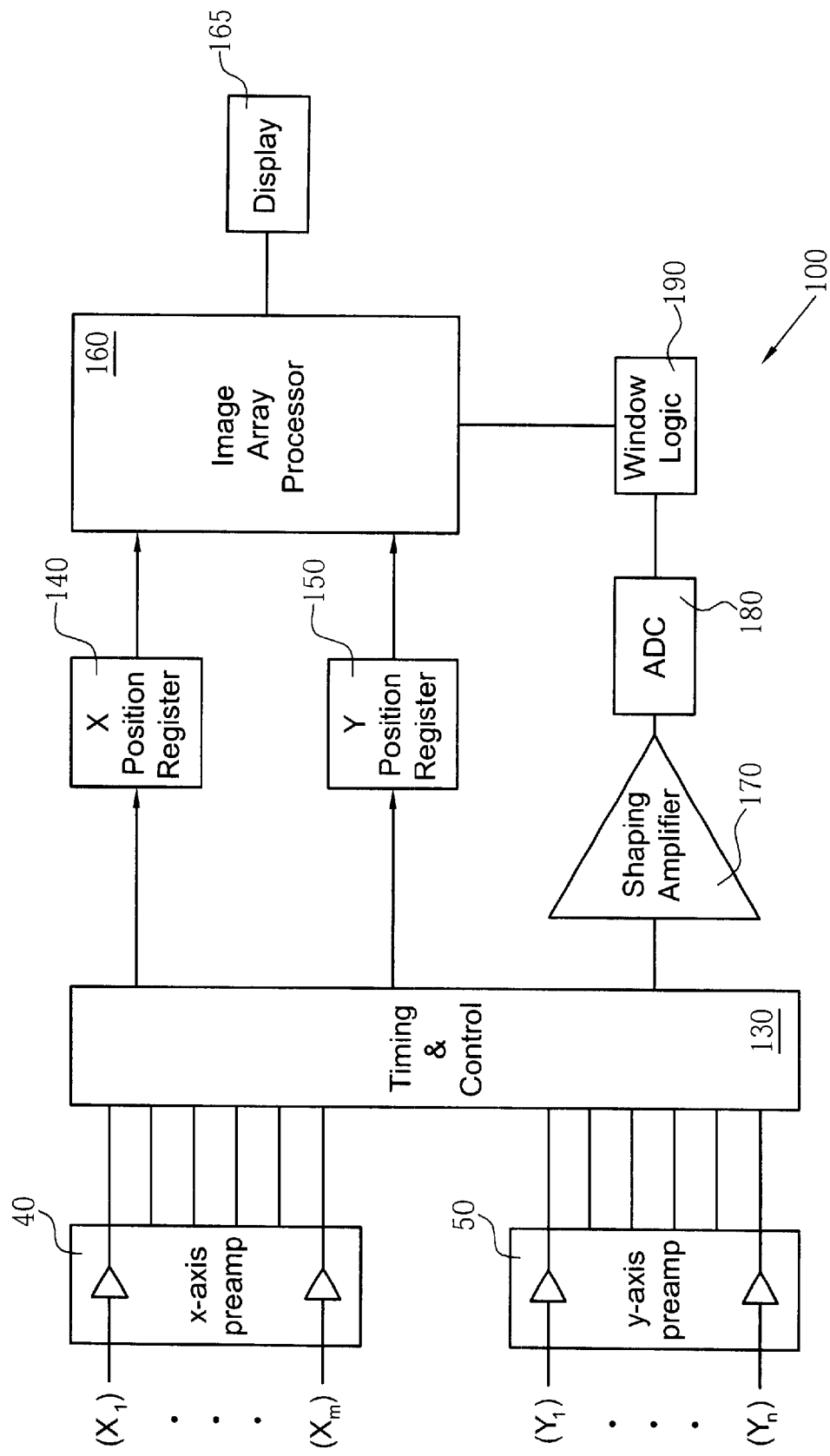
FIG. 2 is a block diagram of the prior art electronics used to form an image from the gamma rays absorbed by the prior art detector of FIG. 1.

FIG. 2 shows a block diagram of the prior art signal processing electronics 100. The signals from the x-axis preamplifiers 40 and the y-axis preamplifiers 50 are processed by a timing and control block 130. When the timing and control block 130 determines that the signals are coincident in time, with only one x and one y, i.e., a valid single photon detection event, the corresponding strip numbers are placed in the x-position register 140 and the y-position register 150. For the assumed event, the x-position register 140 would contain the number i and the y-position register 150 would contain the number j.

The timing and control block 130 then internally switches the signal from the $j^{th}$ y-axis preamplifier 50 to a shaping amplifier 170. The shaping amplifier 170 filters and shapes the signal from the connected y-axis preamplifier 50 to produce a low-noise voltage pulse whose amplitude is proportional to the energy absorbed by the detector 10. An analog-to-digital converter 180 measures the amplitude of the pulse from the shaping amplifier 170 and sends the resulting digital signal to a window logic block 190. The window logic block 190 determines if the signal is within the range expected from the detector 10 for a photon having the characteristic energy of the radioisotope used to form the image. If, for example, the characteristic energy is 140 keV and the detector 10 has energy resolution of plus or minus 1 keV, then the window logic block 190 produces an output signal only if the input signal is in the range of 139 keV to 141 keV.

An image array processor 160 contains an array of m×n memory locations corresponding to the pixels in the image. When the image array processor 160 receives a valid event strobe from the window logic block 190, the x-position register 140 and the y-position register 150 are read and the appropriate memory location is incremented. In the current example, the memory location (i, j) would be incremented.

After processing a large number of events, the image array processor 160 memory cells contain numbers corresponding to the received image. A display 165 produces a visual image corresponding to the information in the image array processor 160. Typically the brightness of a given pixel on the display 165 is proportional to the number of counts in the corresponding memory cell. Alternatively, a color scale where different colors represent the image intensity could be used.

Figure 3:
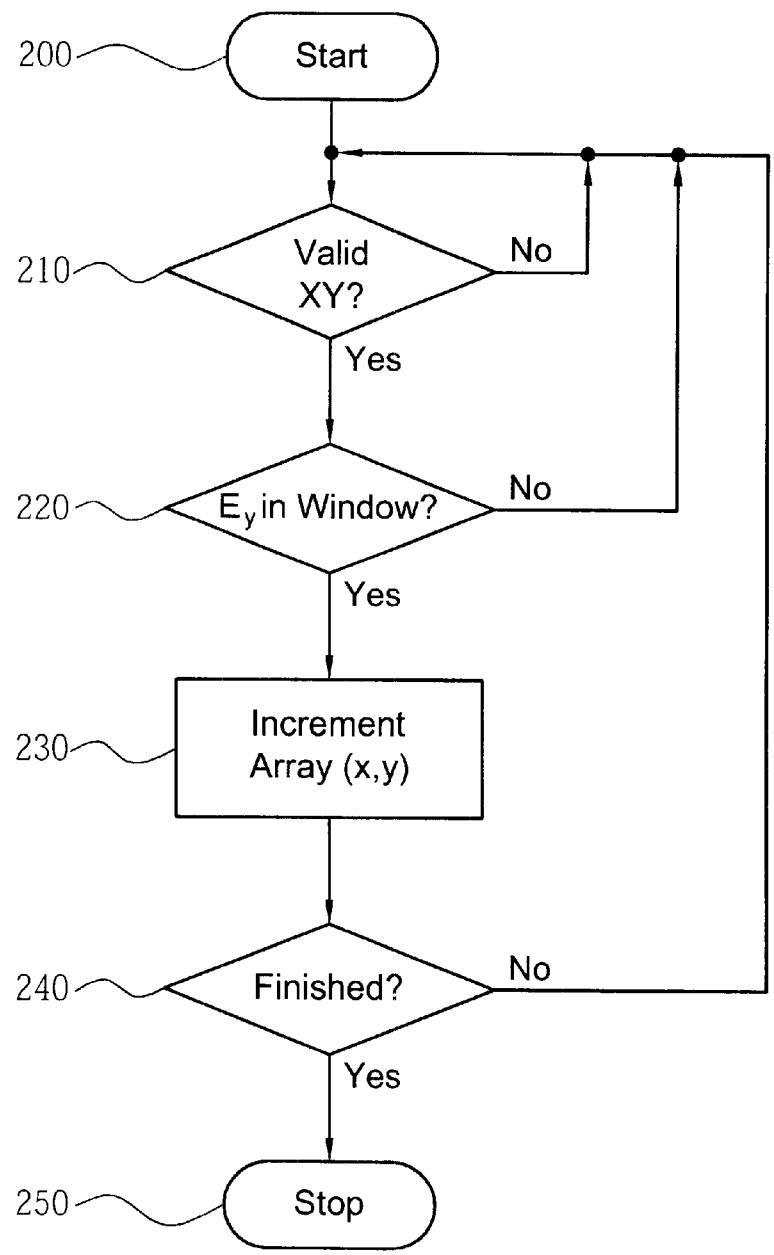
FIG. 3 is a flow chart of the prior art method used to form an image using the prior art detector and electronics of FIGS. 1 and 2.

The flow chart of FIG. 3 is an alternative way of describing the prior art logic of FIG. 2. The acquisition of an image is started by the operator at step 200. The program loops at step 210 waiting for a valid event producing an (X, Y) pair. When a valid (X, Y) pair is detected, the program moves to step 220. In step 220, the energy of the absorbed photon is measured and compared with the predetermined energy window. If the measured energy is not within the window, i.e., the measured energy represents scattered or background photons, the event is rejected and the program returns to the loop at step 210. If the measured energy is within the window the appropriate image array memory element is incremented in step 230. In step 240, a terminating condition is tested and, if met, the program proceeds to step 250 and stops. Exemplary terminating conditions include a preset time, a preset number of total counts, and an operator decision. If the terminating condition is not met the program returns to the loop at step 210.

Figure 4A:
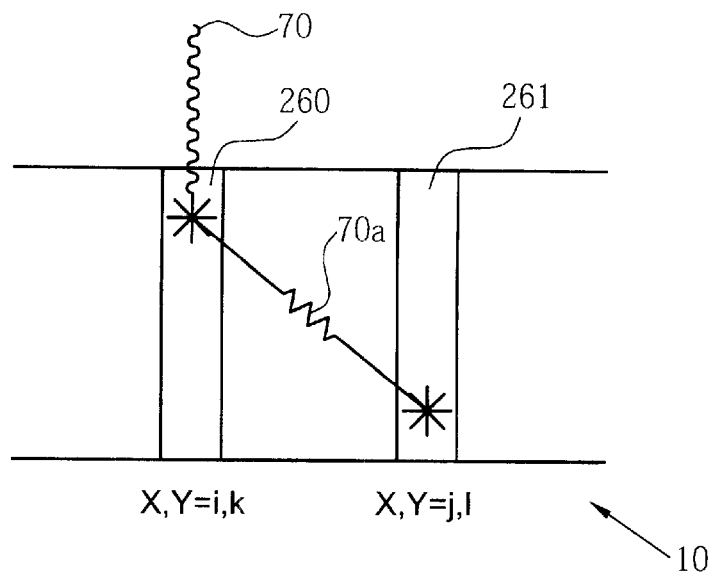
FIG. 4a depicts a sectional view of the absorption of a photon in two separate pixels of the prior art detector of FIG. 1.
Figure 4B:
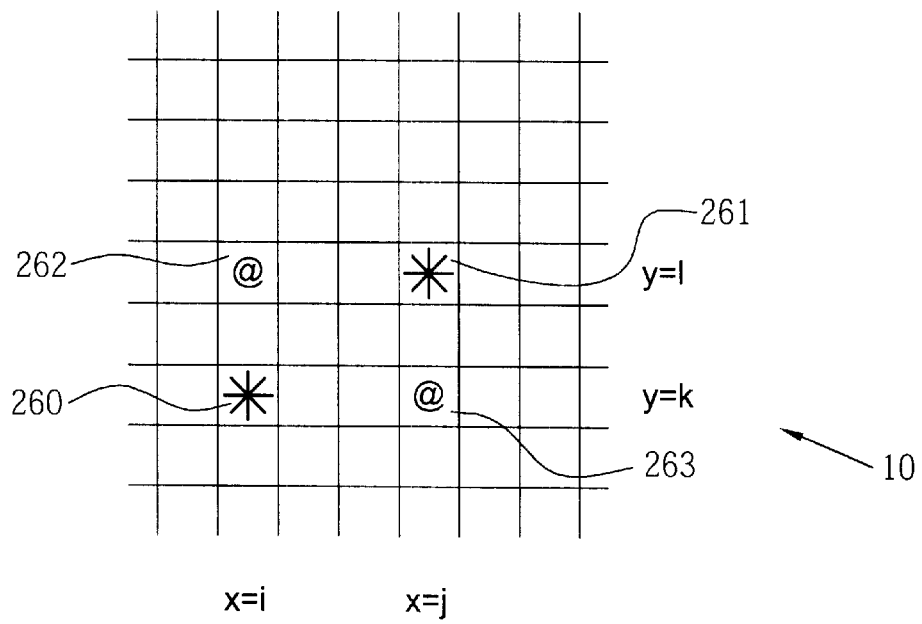
FIG. 4b depicts a top plan view of the absorption of a photon in two separate pixels of the prior art detector of FIG. 1.

FIGS. 4a and 4b represent the case when the incoming photon is Compton scattered in the first pixel it strikes and then loses the rest of its energy in a photoelectric event in some other pixel. FIG. 4a shows a cross-section view of the detector 10. The photon 70 comes through the collimator and scatters in a first pixel 260 at (X, Y)=(i, k). The scattered photon 70a is absorbed in a second pixel 261 at (X, Y)=(j, l) depositing the remainder of its energy. Because photons move at the speed of light, the interactions appear coincident in time to the processing electronics. According to Equation 1, the energy absorbed in the first pixel 260 must be less than the energy absorbed in the second pixel 261.

FIG. 4b is a top view of the same pair of interactions. A first set of pixels 260, 261, located at (X, Y)=(i, k) and (j, l), respectively, are marked with the symbol "*". A second set of pixels 262, 263, located at (X, Y)=(i, l) and (j, k), respectively, are marked with the symbol "@". Time coincident signals are processed by x-axis preamplifiers 40 i and j and by y-axis preamplifiers 50 k and l. From the timing information alone, distinguishing between the valid pair of pixels 260, 261 and the invalid pair of pixels 262, 263 is not possible. However, by measuring the energy signal from each preamplifier 40, 50, it is possible to determine which pair is valid. For a given pixel, the energy measured by the corresponding x-axis preamplifier 40 and the corresponding y-axis preamplifier 50 is the energy deposited in that pixel. Thus, the first pixel 260 is determined to be correct by noting that the energy measured by x-axis preamplifier i, $E(X_i)$, and the energy measured by y-axis preamplifier k, $E(Y_k)$, are essentially identical. Similarly, the second pixel 261 is valid because $E(X_j)$ and $E(Y_l)$ are essentially identical. The first pixel 260 can be determined to be the pixel where the interaction first occurred because, according to Equation 1, the energy deposited in the first pixel 260 is less than that deposited in the second pixel 261.

Pixels 260 and 261 represent a valid two pixel interaction only if the total energy absorbed by the detector 10 corresponds to the original photon energy emitted by the gamma ray source. If the gamma ray 70 is scattered before reaching the detector 10 or if the two interactions do not absorb the total energy, the absorbed energy will be less than the original photon energy. By summing the x- or the y-energy signals from the first set of pixels 260, 261 and comparing the sum to the predetermined energy window, pixels 260 and 261 are qualified as a valid two pixel interaction with pixel 260 the preferred image forming location.

The above description covers the general case for absorption of the photon energy in two but no more than two separate pixels. Having identical X or Y values is also possible for the two pixels. In either of these cases there is no ambiguity in selecting the two pixels. If the X values are the same the appropriate x-axis preamplifier 40 gives the total energy absorbed while the two y-axis preamplifiers 50 distinguish between the two pixels. The y-axis preamplifier 50 with the lowest energy value determines the preferred pixel to use in forming the image. If the Y values are the same the appropriate y-axis preamplifier 50 gives the total energy absorbed while the two x-axis preamplifiers 40 distinguish between the two pixels. The x-axis preamplifier 40 with the lowest energy value determines the preferred pixel to use in forming the image.

In addition to the single pixel interactions measurable by the prior art systems, it is thus clear that additional valid interactions are measurable and can be used to form the image. Use of these interactions requires the following procedure:

1. The energy must be deposited in two and only two pixels. Time coincident signals are produced by two x-axis preamplifiers and two y-axis preamplifiers, one x-axis preamplifier and two y-axis preamplifiers, or two x-axis preamplifiers and one y-axis preamplifier.
2. If the pixels have distinct values of both X and Y, thus producing four possible pixels, then the correct pixel pair is selected by matching the energies measured by the correct x-axis and y-axis preamplifiers.
3. The total energy deposited must be that of the photon in question. Summing the energy deposited in the two pixels must result in a total that is within the energy window.
4. The image location of the interaction is determined by selecting that pixel in which the lowest energy is deposited. In the simplified method both pixels would be used.

FIG. 5 shows a block diagram of the signal processing electronics 270 required to record both the single interaction events of the prior art and also the double interaction events of the present invention. The signals from the x-axis preamplifiers 40 and the y-axis preamplifiers 50 are processed by a timing and control block 275. When the timing and control block 275 determines that the signals are coincident in time, with only one x and one y, i.e., a valid single pixel detection event, the corresponding strip numbers, (X, Y)=(i, k) are placed in the $X_l$ position register 280 and the $Y_l$ position register 300. The energy signal from the $i^{th}$ x-axis preamplifier 40 is routed to the first x-axis shaping amplifier 281 and converted to a digital representation of the absorbed energy, $E(X_i)$, by the first ADC 282. The energy signal from the $k^{th}$ y-axis preamplifier 50 is routed to the first y-axis shaping amplifier 301 and converted to a digital representation of the absorbed energy, $E(Y_k)$, by the first y-axis ADC 302. The energy signals from the first set of x-axis and y-axis ADC's 282, 302 will be essentially the same because the same charge signal in the detector 10 produced the signals. If the energy signals are within the energy window corresponding to the photon in use, the interaction is a valid non-scattered event and the image array processor 320 will increment the array memory location associated with the pixel (X, Y)=(i, k). Other than the availability of energy signals from both sides of the detector, this processing is essentially identical with prior art processing as in FIG. 2.

When the timing and control block 275 determines that the signals from the x-axis preamplifiers 40 and the y-axis preamplifiers 50 are coincident in time, with two and only two values of X, $X_i$ and $X_j$, and two and only two values of Y, $Y_k$ and $Y_l$, the event is then flagged by the timing and control block 275 as a valid two pixel event. The X values are placed in the $X_1$ position register 280 and the $X_2$ position register 290. The Y values are placed in the $Y_1$ position register 300 and the $Y_2$ position register 310. The energy signals from the appropriate preamplifiers are routed to the shaping amplifiers 281, 291, 301, 311. The ADC's 282, 292, 302, 312 produce digital representations of the energy signals of the four preamplifiers 40, 50.

The digital energy signals $E(X_i)$, $E(X_j)$ $E(Y_k)$, and $E(Y_l)$ are processed by the image array processor 320 to produce the valid pixel pair. When $E(X_i)$ is equal to $E(Y_k)$ and $E(X_j)$ is equal to $E(Y_l)$, the valid pair is (X, Y)=(i, k) and (X, Y)=(j, l). Next, the image array processor 320 determines if the interaction resulted in the absorption of the total energy of the target photon. The sum of $E(X_i)$ and $E(X_j)$ gives the total energy deposited in the detector 10. When the total energy is within the energy window corresponding to the photon in use, the event is valid for forming the image. The image array processor 320 then determines the initial interaction point by selecting the smaller of $E(X_i)$ and $E(X_j)$. Because $E(X_i)$ is the smaller energy, the pixel in array memory corresponding to location (X, Y)=(i, k) is incremented. In the simplified method memory locations corresponding to both pixels are incremented.

When the two pixels have identical X or Y values the logic is simpler. There is no ambiguity about the pixel selection.

If the two pixels have the same X value the $X_2$ register 290 contains a zero. The single x-axis preamplifier 40 is routed to the first x-axis shaping amplifier 281 and the first x-axis ADC 282. No signal is routed to the second x-axis shaping amplifier 291 so the second x-axis ADC 292 produces a zero result. If the image array processor 320 finds the sum of the energy values produced by the x-axis ADC's 282, 292 to be within the energy window, the event is known to be a valid unscattered event. The smaller of the two y-energy values allows the selection of the preferred image producing pixel. The logic is similar if the two pixels have the same Y value.

Note that in the preceding descriptions of valid two interaction events, the energy values from the x-axis preamplifiers 40 were used by the image array processor 320 to assure that the total photon energy was absorbed by the detector 10 and that the correct first interaction point was selected. Those skilled in the art will recognize that the corresponding y-axis preamplifiers 50 produce the same signals and could be used to produce the same result. Consider the two energy signals $E(X_i)$ and $E(Y_k)$ in the preceding example. Because these signals are produced by the same charge carriers in pixel (i, k), they are essentially the same. However, because the noise contributions from the preamplifiers and other electronics are not exactly the same, the two values are not exactly equal. It may be advantageous to use the information from both sets of preamplifiers 40, 50 to qualify the event. By averaging $E(X_i)$ and $E(Y_k)$, the precision of the energy determination is improved. Improving the precision of the energy measurements allows the energy window to be set to a smaller value and improves the rejection of photons scattered before they arrive at the detector 10.

Figure 6:
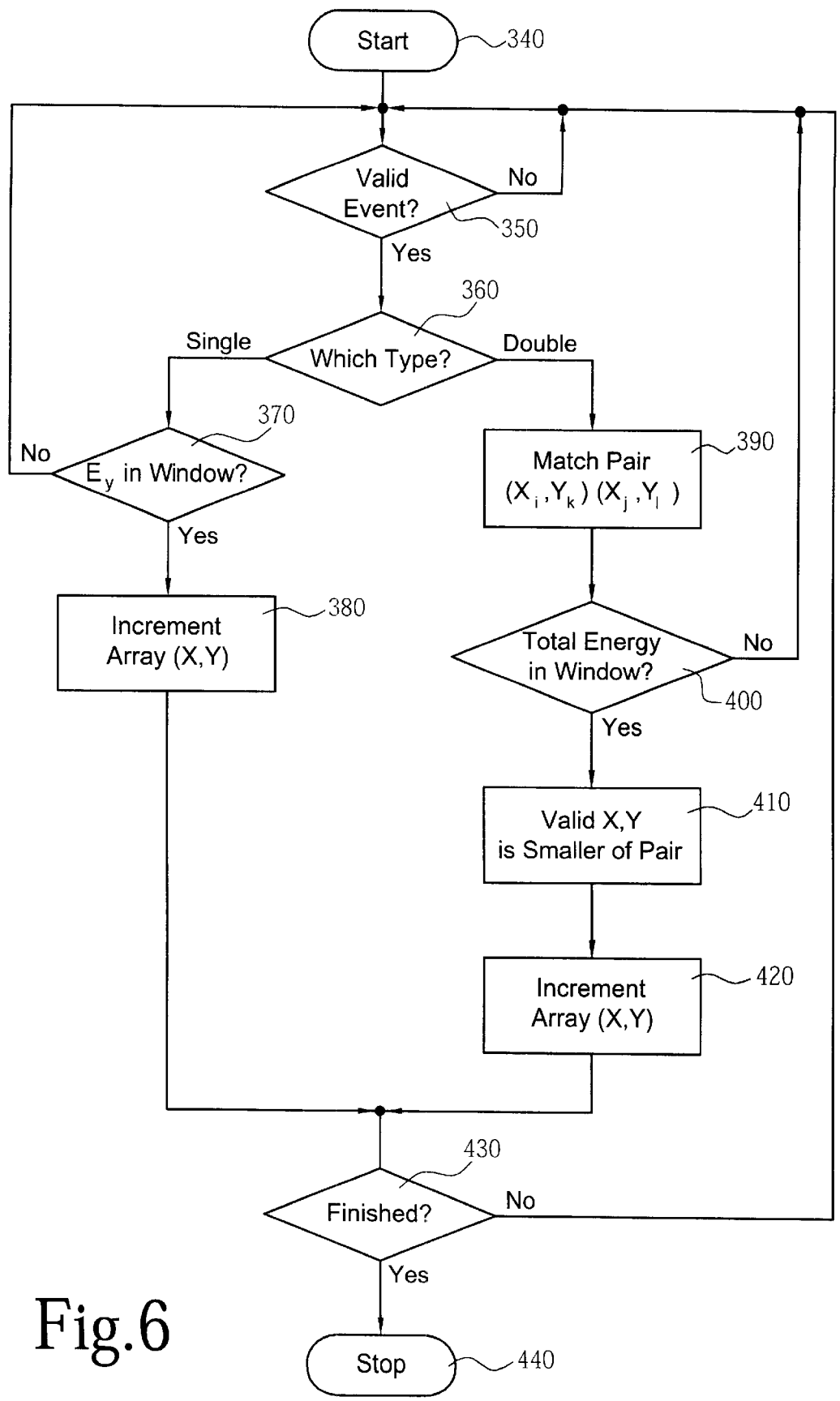
FIG. 6 is a flow chart of the preferred embodiment of the method for forming an image using the detector of FIG. 1 and the electronics of FIG. 5 according to this invention.

The flow chart of FIG. 6 is an alternative way of describing the logic of FIG. 5. The acquisition of an image is started by the operator at step 340. The program loops at step 350 waiting for a valid single pixel event producing an (X, Y) pair or a valid two pixel event producing two X values and two Y values. The two X values or the two Y values might be identical. At step 360, one of two branches is taken depending on whether the event was a single pixel or a double pixel event. If only a single (X, Y) pair is found the program branches to step 370 where the energy is compared to the window. If the energy is not within the window the program branches back to the loop at step 350. If the energy is within the window the memory array location corresponding to (X, Y) is incremented in step 380 and the program proceeds to step 430. If a double pixel event is detected at step 360 the program proceeds to step 390. In step 390, if there are two distinct X values and two distinct Y values, a valid pair $(X_1, Y_1)$ and $(X_2, Y_2)$ is selected by noting that $E(X_1)$ must equal $E(Y_1)$ and that $E(X_2)$ must equal $E(Y_2)$. The total energy of the event is then determined in step 400 by adding $E(X_1)$ plus $E(X_2)$ or $E(Y_1)$ plus $E(Y_2)$ or by taking the average value of the two sums. If the total energy is not within the window the program moves back to the loop at step 350. If the total energy is within the window the program moves to step 410 where the initial interaction pixel is selected by choosing the pixel pair in which the smallest energy is deposited. The program then moves to step 420 where the memory array location corresponding to the selected (X, Y) pair is incremented. In the simplified method memory locations corresponding to both pixels are incremented. Both steps 380 and 420 lead to step 430. In step 430 a terminating condition is tested and, if met, the program proceeds to step 440 and stops. The terminating condition might be a preset time, a preset number of total counts, or an operator decision. If the terminating condition is not met the program returns to the loop at step 350.

It will be obvious to those skilled in the art that a variety of alternate electronic circuits can produce the desired results of the present invention. In particular, the analog shaping amplifiers and ADC's of FIG. 5 could be replaced by sampling ADC's and digital filters.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, we claim:

1. A gamma camera for imaging emissions from a gamma ray source wherein the emissions are subject to Compton scattering, said gamma camera comprising:

a collimator for collimating the emissions;

a detector responsive to an emission producing two interaction points, said detector having a first plurality of collecting electrodes formed as strips and a second plurality of collecting electrodes formed as strips disposed at a selected angle with respect to said first plurality of collecting electrodes, said first plurality of collecting electrodes producing a first event signal containing a first energy value and a first position value for each of said two interaction points, said second plurality of collecting electrodes producing a second event signal containing a second energy value and a second position value for each of said two interaction points;

a timer;

a controller in electrical communication with said timer and said detector, said controller associating an occurrence time with each said first event signal and each said second event signal, said controller matching one of said first event signals with one of said second event signals to produce a first interaction point and a second interaction point, said first interaction point and said second interaction point each defining an energy value;

a position processor in electrical communication with said controller, said position processor selecting one of said first interaction point and said second interaction point as a primary interaction point when said first interaction point and said second interaction point are time coincident and when a sum of said first interaction point energy value and said second interaction point energy value is substantially equal to an energy value characteristic of the gamma ray source;

an image processor in electrical communication with said position processor, said image processor incrementing a position in an image array, said position corresponding to said primary point of interaction, said image array corresponding to said detector array; and a display in communication with said image processor, said display displaying said image array.

2. The gamma camera of claim 1 wherein said primary interaction point is said first interaction point when said first interaction point energy value is less than said second interaction point energy value and said primary point of interaction is said second interaction point when said second interaction point energy value is less than said first interaction point energy value.

3. The gamma camera of claim 1 wherein said first interaction point energy value and said second interaction point energy value is selected from the group consisting of said first event signal energy value, said second event signal energy value, and an average of said first event signal energy value and said second event signal energy value.

4. The gamma camera of claim 1 wherein said first plurality of collecting electrodes is substantially orthogonal with respect to said second plurality of collecting electrodes, said first event signal position value and said second event signal position value defining a rectilinear coordinate pair.

5. A method for improving the sensitivity of a gamma camera by accumulating detected emissions from a gamma ray source which have been Compton scattered, said method comprising the steps of:

(a) detecting an emission producing two event signals on a first coordinate axis and two event signals on a second coordinate axis, said first coordinate axis event signals and said second coordinate axis event signals occurring substantially simultaneously, each said coordinate axis event signal including an energy value and a position value;

(b) defining a first interaction point and a second interaction point as a matched pair of said first coordinate axis event signals and said second coordinate axis event signals having substantially equal said energy values;

(c) selecting said first interaction point energy value from the group consisting of said first interaction point first event signal energy value, said first interaction point second event signal energy value, and an average of said first interaction point first event signal energy value and said first interaction point second event signal energy value;

(d) selecting said second interaction point energy value from the group consisting of said second interaction point first event signal energy value, said second interaction point second event signal energy value, and an average of said second interaction point first event signal energy value and said second interaction point second event signal energy value;

(e) selecting as a primary interaction point one of said first interaction point and said second interaction point, said primary interaction point being said first interaction point if said first interaction point energy value is less than said second interaction point energy value, said primary interaction point being said second interaction point if said second interaction point energy value is less than said first interaction point energy value; and (f) storing said primary interaction point as a valid detected event, hereby improving the sensitivity of the gamma camera.

6. An orthogonal strip gamma camera for imaging an emission from a gamma ray source, said orthogonal strip gamma camera comprising:

means for collimating the emission such that an image of said gamma ray source is produced on an orthogonal strip gamma detector;

means for producing a detection signal for each point at which the emission interacts with said orthogonal strip gamma detector, said detection signal having a first energy value, a first position coordinate, a second energy value and a second position coordinate;

means for determining whether a first said detection signal and a second said detection signal are time coincident;

means for determining valid position coordinates for each of said first detection signal and said second detection signal;

means for determining an energy value for each of said first detection signal and said second detection signal;

means for computing a total energy value as the sum of said first detection signal energy value and said second detection signal energy value;

means for comparing said total energy value to a characteristic energy value for said gamma ray source;

means for selecting one of said first detection signal and said second detection signal as representing a primary point of interaction;

means for incrementing a position in an image array, said position corresponding to said primary point of interaction position coordinates;

means for displaying said image array; and whereby said gamma camera is responsive to the detected emissions which have been Compton scattered.

7. The orthogonal strip gamma camera of claim 6 wherein said detection signal energy value is selected from the group consisting of said first energy value, said second energy value, and the sum of said first energy value and said second energy value.

* * * * *